United States Patent [19]

Nagasawa et al.

[11] Patent Number: 5,718,746
[45] Date of Patent: Feb. 17, 1998

[54] PROCESS OF PRODUCING AQUEOUS PIGMENT INK

[75] Inventors: Toshiyuki Nagasawa, Yawata; Tetsuji Kihara, Takatsuki; Sohko Itoh, Neyagawa, all of Japan

[73] Assignee: Orient Chemical Industries, Ltd., Osaka, Japan

[21] Appl. No.: 618,767

[22] Filed: Mar. 20, 1996

[30] Foreign Application Priority Data

Mar. 20, 1995 [JP] Japan ............... 7-060408/1995

[51] Int. Cl.$^6$ .................................. C09D 11/00
[52] U.S. Cl. .................. 106/31.9; 106/31.65; 106/31.6; 106/478
[58] Field of Search .................. 106/20 R, 20 C, 106/478, 31.9, 31.65, 31.6

[56] References Cited

U.S. PATENT DOCUMENTS

| | | | |
|---|---|---|---|
| 2,641,533 | 6/1953 | Cines et al. | 106/478 |
| 3,971,849 | 7/1976 | Barr | 106/478 |
| 3,992,218 | 11/1976 | Suetsugu et al. | 106/478 |
| 5,395,435 | 3/1995 | Mitzobuchi | 106/478 |
| 5,609,671 | 3/1997 | Nagasawa | 106/478 |

FOREIGN PATENT DOCUMENTS

| | | |
|---|---|---|
| 0688836 | 12/1995 | European Pat. Off. |
| 1107124 | 3/1968 | United Kingdom. |

*Primary Examiner*—Helene Klemanski
*Attorney, Agent, or Firm*—Birch, Stewart, Kolasch & Birch, LLP

[57] ABSTRACT

The present invention provides a process for producing aqueous pigment ink which forms a black matrix having high optical density, excellent flatness of a film and low conductivity, and imparts high resolution power to a color filter. The process comprises the steps of:

finely dispersing a carbon black having an oil absorptivity of not more than 100 ml/100 g in an aqueous medium; and oxidizing the carbon black by using a hypohalite.

11 Claims, No Drawings

PROCESS OF PRODUCING AQUEOUS PIGMENT INK

FIELD OF THE INVENTION

The present invention relates to a process for producing aqueous pigment ink. More particularly, it relates to a process for producing aqueous pigment ink which can be used for producing an image displaying device such as a black matrix for a CRT or for an optical filter of a liquid crystal plasma display.

BACKGROUND OF THE INVENTION

In a color filter used for a liquid crystal display element for displaying a colored image, colored cells of three primary color i.e., R (red), G (green) and B (blue) are alternatively arranged on an electrical insulating transparent substrate such as glass, etc. In order to prevent an undesirable leak of light and to maintain a contrast of the image high, a black matrix is provided at the gap between the colored cells of the colored layer. A coating composition which contains carbon or metal oxide pigment is generally used for forming the black matrix, because the pigment coating composition is superior in light shutability and looks black or nearly black. The coating composition for forming a black matrix is generally prepared from the above mentioned aqueous pigment ink containing a pigment and an aqueous medium, and a film-forming resin.

Examples of the typical carbon pigment include carbon black. The carbon black is cheap and is easily available, but it has poor dispersibility in water and provides poor optical density. Accordingly, when a black matrix of a color filter is formed by using a coating composition containing the carbon black, the black matrix must become relatively thick so as to enhance the light shutability. As a result, there is a problem that a surface of the black matrix becomes irregular and resolution of the color filter becomes poor.

Examples of the typical metal oxide pigment include metal chrome. The metal chrome has high conductivity. Accordingly, when a black matrix is formed by using the metal chrome, a surface of the black matrix must be coated with a resin so as to impart electrical insulating properties. Furthermore, it becomes difficult to look an image because the metal chrome has high reflectivity. There is also a problem that a cost is high for producing the coated film using the metal chrome.

OBJECTS OF THE INVENTION

The present invention solves the above conventional problems, and a main object of the present invention is to provide a process for producing aqueous pigment ink which forms a black matrix having high optical density, excellent flatness of film and low conductivity, and imparts high resolution power to a color filter.

This object as well as other objects and advantages of the present invention will become apparent to those skilled in the art from the following description.

SUMMARY OF THE INVENTION

The present invention provides a process for producing aqueous pigment ink, comprising the steps of:

finely dispersing a carbon black having an oil absorptivity of not more than 100 ml/100 g in an aqueous medium; and oxidizing the carbon black by using hypohalite. Thereby, the above object can be accomplished.

DETAILED DESCRIPTION OF THE INVENTION

Carbon black is generally produced by pyrolytically decomposing a natural gas or liquid hydrocarbon (e.g., heavy oil, tar, etc.), or by incompletely burning them. The carbon black is classified into channel black, furnace black, etc. according to a process for producing them, and various sorts of carbon black is commercially available.

As aqueous pigment ink, those referred to as a carbon black for coloring are suitably used. Examples of the carbon black include "Carbon black" manufactured by Mitsubishi Kagaku Co., Ltd., "Oil furnace" manufactured by Cabbot Co., "Color furnace" manufactured by Degsa Co., "Carbon black for coloring" manufactured by Columbia Carbon Japan, Co., Ltd., etc.

The carbon black used-in the process of the present invention may be basic, neutral or acidic, and those having small oil absorptivity are preferred. The carbon black having small oil absorptivity is liable to be finely divided by the process of the present invention and, therefore, good results are obtained in dispersibility and electrical insulation properties. The carbon black which is suitable for use in the present invention has an oil absorptivity of not more than 100 ml/100 g, preferably not more than 80 ml/100 g.

The term "oil absorptivity" used herein means an amount of an oil (such as dibutyl phthalate, etc.) absorbed by a predetermined amount of dried carbon black, and is defined in JIS K6221. The measuring method is summarized as follows, but described in detail in Carbon Black Hand Book, published by Carbon Black Society, issued by Tosho Shuppan Co., pages 440 to 441.

Method A (Mechanical method)

In this method, oil absorptivity of carbon black is measured mechanically by using an absorbed meter. Dibutyl phthalate (DBP) was filled in the absorbed meter with controlling the cock thereof, so that all bubbles leave from an automatic buret system. The conditions for measurement are as follows.

a) Tension of spring 80 to 90N (8.16 to 9.18 kgf) for type A absorbed meter 17 to 24.5N (1.79 to 2.50 kgf) for type B absorbed meter b) Rotation rate of rotor 125 rpm c) Calibration of limit switch for torque 5 d) Dumper bulb is controlled so that the time required for decreasing the calibration of torque from 10 to 0.

e) Rate for dropping DBP 4 ml/min

The rate for dropping DBP is controlled by measuring practically. Then, predetermined amount ($W_D$) of dried carbon black is charged in a mixing room of the absorbed meter, the buret counter is set to zero point, and DBP is dropped at a mode of automatic. When a torque of the sample becomes equal to the value of the calibration of the limit switch for torque ("5" in this case), the limit switch automatically stops the drop of DBP. A value of the buret counter at that time (V) is recorded. The oil absorptivity (OA) is figured out according to the following equation:

$$OA = (V/W_D) \times 100$$

Method B (Spatula kneading method)

Weighed precisely 1.00±1 g ($W_D$) of dried carbon black, and it is placed on a smooth surface of glass or stone and pulverized by a spatula. Small amount of DBP is dropped on the surface, and the carbon black is moved in the dropped DBP and kneaded carefully by spatula. The mass was kneaded about 10 to 15 minutes with adding DBP dropwise slowly until the mass becomes tight pat. The amount of added DBP (V) was recorded. The oil absorptivity (OA) is figured out according to the above equation.

As described above, the process for measuring the oil absorptivity include method A (mechanical method) and method B (spatula kneading method). The both methods A and B may be employed in the present invention, but the process A is preferred.

Examples of the carbon black which is suitable for use in the present invention include "#45" manufactured by Mitsubishi Kagaku Co., Ltd., "MA8" manufactured by Mitsubishi Kagaku Co., Ltd., "Raven 1200" manufactured by Columbia Carbon Japan Co., Ltd., "Printex 55" manufactured by Degsa Co., "REGAL 415R" manufactured by Caplac Co.,etc.

In the process of the present invention, such a carbon black is finely dispersed in an aqueous medium, firstly.

An aqueous medium in which the carbon black is finely dispersed, includes the same medium as used in an aqueous ink composition of which recording agent is a water-soluble dye. That is, it is water (deionized water) or a mixed solution of water and a water-soluble organic solvent. Examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol, isobutyl alcohol, etc.; ketones or ketone alcohols, such as acetone, diacetone alcohol, etc.; ethers such as tetrahydrofuran (THF), dioxane, etc.; alkylene glycols such as ethylene glycol, propylene glycol, diethylene glycol, triethylene glycol, etc.; polyalkylene glycols such as polyethylene glycol, polypropylene glycol, etc.; lower alkyl ethers of polyhydric alcohols, such as ethylene glycol monoethyl ether, propylene glycol monomethyl ether, diethylene glycol monomethyl ether, triethylene glycol monoethyl ether, etc.; lower alkyl ether acetates such as polyethylene glycol monomethyl ether acetate, etc.; glycerin; 2-methylpyrrolidone, N-methyl-2-pyrrolidone, etc.

The term "finely dispersing" means that powder is dispersed until it has a fine particle size of not more than a predetermined level.

The carbon black is finely dispersed so that it has an average particle size of not more than 200 nm, preferably not more than 150 nm, more preferably about 100 nm, most preferably not more than 100 nm. When the average particle size of the carbon black is more than 200 nm, a surface of the coated film becomes rough, which results in poor resolution of the color filter.

The carbon black is finely dispersed, for example, by sufficiently mixing the aqueous medium with the carbon black in a suitable proportion, adding a mill medium, followed by dispersing for 1 to 7 hours using a dispersing device.

It is preferred that the carbon black is finely dispersed in the aqueous medium in an amount of 0.5 to 50% by weight, preferably 1 to 25% by weight, based on the weight of the resulting aqueous pigment ink. When the amount of the carbon black is less than 0.5% by weight, optical density of the aqueous pigment ink becomes poor. On the other hand, when the amount exceeds 50% by weight, stability of the dispersion becomes poor.

It is preferred that the mill medium is in the form of beads. By using a beads mill, the surface area of carbon black as the raw material is increased and the oxidation reaction described hereinafter is accelerated. The material of the mill medium is not specifically limited, for example, there can be used those made of glass, stainless steel, zircon, zirconia, etc. It is preferred that the mill medium is charged in an amount of 60 to 95% by volume, particularly 75 to 85% by volume, based on the volume of the dispersing device.

After the carbon black was finely dispersed in the aqueous medium, a hypohalite was added to the resulting dispersion to oxidize the carbon black.

The amount of the hypohalite to be added varies depending on the kind thereof, and is generally 1.5 to 75% by weight, preferably 4 to 50% by weight, based on 100% by weight of the carbon black. Examples of the preferred hypohalite include sodium hypochlorite and potassium hypochlorite.

An oxidation reaction is conducted by heating to not less than 50° C., preferably at 95° to 105° C., followed by stirring for not less than 2 hours, preferably about 3 to 20 hours.

A hydrophilic group (e.g., hydroxyl group, carboxyl group, etc.) is formed on a surface of the carbon black by the oxidation reaction, thereby good dispersibility in water is imparted to the carbon black particles. Particularly, an acidic group such as carboxyl group partially forms salt with cation derived from the hypohalite, thereby dispersibility in water is enhanced.

A process in which the finely dispersing and oxidizing the carbon black is simultaneously conducted is also included in a scope of the present invention. In that case, the aqueous medium, carbon black and hypohalite are mixed in a suitable proportion and, after adding the mill medium, the mixture was dispersed with heating for about 2 to 20 hours, preferably about 3 to 10 hours, using the dispersing device.

Then, non-oxidized carbon black and coarse particles are removed from the dispersion subjected to the oxidation reaction, followed by purifying and concentrating the dispersion, and aqueous pigment ink of the present invention is obtained. The non-oxidized carbon black and the coarse particles can be removed, for example, by using a wire mesh (about 400 mesh). The purification and concentration of the dispersion can be conducted by using a separation film having a bore diameter of not more than 0.01 µm (e.g., ultrafiltration film, reverse osmosis film, etc.). The oxidized dispersion is generally concentrated to a pigment content of 10 to 20% by weight.

The resulting concentrated dispersion can be used as aqueous pigment ink. Otherwise, it may be further concentrated until the pigment content becomes 50% by weight to form a pigment paste, or desalted, concentrated and dried to form a powdered pigment. In that case, the aqueous pigment ink can be prepared by adding an aqueous medium to the pigment paste or the powdered pigment, and controlling the concentration thereof.

In the aqueous pigment ink obtained by the process of the present invention, the oxidized carbon black has high active hydrogen content (1.5 to 2.5 mmol/g) and shows good dispersibility in water. The carbon black having high surface active hydrogen content has, for example, a lot of carboxyl groups and hydroxy groups on the surface, and hydrophilicity of the carbon black is improved. At the same time, the surface area also becomes large and dispersibility in water is improved by having chemical properties similar to an acid dye.

On the other hand, the surface active hydrogen content of commercially available acidic carbon black is not more than 1.0 mmol/g, and the degree of oxidation is lower and dispersibility in water is poor by comparison with the oxidized carbon black obtained by the process of the present invention.

For comparison, stability of the aqueous pigment ink obtained by the process of the present invention and those containing commercially available carbon black are shown in Table 1.

TABLE 1

|  | (Stability) |
| --- | --- |
| Ink (oxidized carbon black: 20% by weight) of the present invention[1] | Hydrophilicity is large, stable for not less than 3 months |
| Acidic carbon black "MA8" manufactured by Mitsubishi Kagaku Co., Ltd.[2] | Hydrophilicity is small, precipitated within 2 minutes |
| Acidic carbon black "#2400B" manufactured by Mitsubishi Kagaku Co., Ltd.[3] | Hydrophilicity is small, precipitated within 2 minutes |
| Carbon black "#20" manufactured by Mitsubishi Kagaku Co., Ltd.[4] | No hydrophilicity, floated on the water surface |
| Carbon black "#45L" manufactured by Mitsubishi Kagaku Co., Ltd.[5] | No hydrophilicity, floated on the water surface |

[1] pH: 8 to 10
[2] pH: 2.5 to 3.0, oil absorptivity: about 58 ml/100 g
[3] pH: 3.0 to 3.5, oil absorptivity: about 45 ml/100 g
[4] pH: 7.0 to 8.0, oil absorptivity: about 122 ml/100 g
[5] pH: 7.0 to 8.0, oil absorptivity: about 45 ml/100 g Regarding dispersibility in water and stability, the oxidized carbon black of the present invention was superior in dispersibility without using a pigment dispersion resin nor a dispersion stabilizer, and was stable for not less than 3 months. To the contrary, a commercially available carbon black showed poor or no hydrophilicity, and it floated on the water surface or precipitated within few minutes after stirring.

The aqueous pigment ink obtained by the present invention contains the carbon black which was highly oxidized and finely dispersed in an aqueous medium. Accordingly, it is superior in dispersibility in water, optical density (light shutability) as a black matrix, and image density as an ink composition for writing and ink-jet recording.

The aqueous pigment ink obtained by the process of the present invention has a viscosity of about 10 to 25 cps/25° C. when the pigment content is 20% by weight, and the average-particle size of the oxidized carbon black was about 80 to 150 nm. The yield of the oxidized carbon black pigment dispersion calculated on the basis of the carbon black was not less than 80%.

A black matrix for a CRT or for an optical filter of a liquid crystal display can be formed by using the aqueous pigment ink obtained by the process of the present invention, for example, according to the pigment dispersing process, printing process, electrodeposition process, etc.

In the electrodeposition process, a coating composition for forming a black matrix which contains a film-forming resin for electrodeposition and a pigment is electrodeposition-coated on an electrode placed on a substrate.

The film-forming resin for electrodeposition includes anionic and cationic types. Examples of the anionic type resin include an acrylic resin, a methacrylic acid derivative resin, a polyester resin, a malated oil resin, etc. Examples of the cationic type resin include an amine-modified resin, etc. Examples of the amine-modified resin include an amine-modified acrylic resin, an amine-modified epoxy resin, an amine-modified polybutadiene resin, an amine-modified polyurethanepolyol resin, etc.

In case of the anionic polymer, the polymer is neutralized with inorganic alkalines such as amines (e.g., triethylamine, diethylamine, dimethylethanolamine, diisopropanolamine, etc.), ammonia, sodium hydroxide, etc. so that it can dissolve or disperse in water. In case of the cationic polymer, the polymer is neutralized with acids (e.g., acetic acid, lactic acid, etc.) so that it can dissolve or disperse in water. They are used thereby as a water dispersed or water dissolved type composition.

Specifically, an aqueous pigment composition for forming a black matrix which comprises the aqueous pigment ink and the film-forming resin for electrodeposition (e.g., aqueous solution of acrylic acid polymer neutralized with triethylamine) containing a curing agent, can be electrodeposition-coated on a glass plate with an IOT film so that the film thickness becomes 2.5 μm.

Surface electric resistance value (electrical insulating properties), optical density (light shutability) and surface roughness (flatness) of the resulting electrodeposition-coated plate were determined. As a result, the surface electric resistance value was not less than $1 \times 10^6$ Ω, the optical density was 3.0 to 4.0, and the surface roughness was about 0.20 to 0.25 μm.

The aqueous pigment ink having a pigment content of 0.5 to 50% by weight obtained by the present invention can also be used as the ink for writing or ink-jet recording.

It is preferred that the pigment is contained in an amount within a range of 1 to 30% by weight, based on the total weight of the ink composition. When the amount is less than 1% by weight, density of the written ink becomes poor. On the other hand, when it exceeds 30% by weight, the carbon black becomes liable to agglomerate. Therefore, a precipitate readily form during a long period of preservation and ejection stability becomes poor.

The ink composition of the present invention do not have a problem of corrosion, because the resulting carbon black is sufficiently desalted and purified. Furthermore, all or a part of active hydrogen of carboxyl groups on a surface of the carbon black becomes a sodium salt of, for example, sodium hypochlorite used as an oxidizing agent and, therefore, pH of the ink composition does not have to be controlled.

However, it is preferred that pH is controlled from weak acid to alkaline (pH 6 to 10) similar to water-soluble dye ink, so as to finely disperse the carbon black to be used in the present invention for a long period of time.

As a pH controlling agent, there can be used aqueous ammonia; alkylamine, nitrogen-containing cyclic amine, alkanolamine, etc.; hydroxides of alkali metals such as sodium hydroxide, potassium hydroxide, lithium hydroxide, etc. Furthermore, there can also be used additives (e.g., a viscosity controlling agent, an antiseptic agent, a rust preventing agent, etc.) which are used for this kind of ink.

Furthermore, water-soluble resins (e.g., a lower condensate of vinylpyrrolidone, a water-soluble alkyd resin and a water-soluble acrylic resin) and alcohol-soluble resins (e.g., a phenol resin, an acrylic resin, a styrene-maleic acid resin or a ketone resin) may also be included so as to impart gloss to a printed matter or written literature, depending on ejection properties of the recording solution. It is preferred that the weight ratio of the water-soluble or alcohol-soluble resin to carbon black is not more than ⅓.

The recording solution obtained in the present invention is superior in fine dispersibility in an aqueous or liquid medium due to the above described characteristics of the highly oxidized carbon black. The surface area of the carbon black was also increased. As a result, the black density of the recording solution is increased, thereby high printing density which is the same as or higher than that of black dye ink is obtained.

According to the present invention, there was provided a process for producing aqueous pigment ink which forms a black matrix having high optical density, excellent flatness of a film and low conductivity, and imparts high resolution to a color filter.

The aqueous pigment ink obtained by the process of the present invention provides a written or recorded image which is superior in stability, optical density, light resistance and water resistance when using as ink for writing or ink-jet recording, because of its excellent dispersibility in water.

EXAMPLES

The following Examples and Comparative Examples further illustrate the present invention in detail but are not to be construed to limit the scope thereof.

Example 1

Production of aqueous pigment ink

To a glass four-necked flask (5000 ml), a carbon black having an oil absorptivity of 50 ml/100 g [#45, manufactured by Mitsubishi Kagaku Co., Ltd.] (300 g) and water (2700 ml) were added and, after mixing sufficiently, glass beads having a diameter of 3 mm (1000 ml) were added, followed by stirring. One hour after the beginning of the stirring, sodium hypochlorite (effective chlorine concentration: 12%) (500 g) was added and the mixture was subjected to an oxidation treatment at 100° to 105° C. for 10 hours. Then, the oxidized solution was filtered with heating. After the resulting wet cake containing the beads was dispersed again in water (3000 ml), the beads, non-oxidized carbon black and coarse particles were removed from the slurry using a wire mesh (400 mesh). This slurry was desalted and purified using an ultrafiltration film until the conductivity became not more than 0.2 mS. Furthermore, this pigment dispersion was concentrated until the pigment content became 20%.

Viscosity of this pigment ink was measured. As a result, it was 25 cps/25° C. The average particle size of the carbon black was 100 nm. The yield of this pigment dispersion was 85%.

The average-particle size of the oxidized carbon black was measured using a laser beam scattering type particle size distribution measuring device [LPA 3000/3100 (trade name), manufactured by Ohtsuka Denshi Co., Ltd.].

Example 2

Production of aqueous pigment ink

A mixed solution of 300 parts by weight of a carbon black having an oil absorptivity of 58 ml/100 g [MA8, manufactured by Mitsubishi Kagaku Co., Ltd.] and 2700 parts by volume of water was dispersed by circulating for 3 hours using a wide type wet dispersing device filled with zirconia beads having a diameter of 1 mm$\phi$ to prepare a dispersion of carbon black.

After the resulting dispersion (3000 g) was transferred to a four-necked flask, sodium hypochlorite (effective chlorine concentration: 12%) (500 g) was added and the mixture was subjected to an oxidation treatment at 100° to 105° C. for 10 hours according to the same manner as that described in Example 1. Then, the oxidized solution was filtered with heating. After the resulting wet cake containing the beads was dispersed again in water (3000 ml), the non-oxidized carbon black and coarse particles were removed using a wire mesh (400 mesh). This slurry was desalted and purified using an ultrafiltration film until the conductivity became not more than 0.2 mS. Furthermore, this pigment dispersion was concentrated until the pigment content became 20%.

Viscosity of this pigment ink was measured. As a result, it was 20 cps/25° C. The average particle size of the carbon black was 110 nm. The yield of this pigment dispersion was 82%.

Comparative Example 1

Production of aqueous pigment ink

Water (2700 ml) was added to the carbon black having an oil absorptivity of 50 ml/100 g used in Example 1 and, after mixing sufficiently, sodium hypochlorite (effective chlorine concentration: 12%) (500 g) was added and the mixture was subjected to an oxidation treatment at 100 to 105° C. for 10 hours. Then, the oxidized solution was filtered with heating. After the resulting wet cake was dispersed again in water (3000 ml), non-oxidized carbon black and coarse particles were removed from the slurry using a wire mesh (400 mesh). According to the same manner as that described in Example 1, this slurry was desalted and purified using an ultrafiltration film until the conductivity became not more than 0.2 mS. Furthermore, this pigment dispersion was concentrated until the pigment content became 20%.

Viscosity of this pigment ink was measured. As a result, it was 15 cps/25° C. The average particle size of the carbon black was 170 nm. The yield of this pigment dispersion was 51%.

Comparative Example 2

Production of aqueous pigment ink

According to the same manner as that described in Example 1 except for using a carbon black having an oil absorptivity of 122 ml/100 g [#20, manufactured by Mitsubishi Kagaku Co., Ltd.] in place of the carbon black having an oil absorptivity of 50 ml/100 g used in Example 1, the dispersion treatment was conducted for 1 hour using glass beads. Thereafter, sodium hypochlorite (effective chlorine concentration: 12%) (500 g) was added and the mixture was subjected to an oxidation treatment at 100 to 105° C. for 10 hours. Then, the oxidized solution was filtered with heating. After the resulting wet cake was dispersed again in water (3000 ml), non-oxidized carbon black and coarse particles were removed from the slurry using a wire mesh (400 mesh). This slurry was desalted using an ultrafiltration film until the conductivity became not more than 0.2 mS. Furthermore, this pigment dispersion was concentrated until the pigment content became 20%.

Viscosity of this pigment ink was measured. As a result, it was 15 cps/25° C. The average particle size of the carbon black was 151 nm. The yield of this pigment dispersion was 80%.

Example 3

Electrodeposition coating

An aqueous solution of an acrylic acid resin neutralized with triethylamine (containing a curing agent) (500 g) was mixed with a dispersion (150 g) (pigment content: 20%) obtained in Example 1 to prepare a coating composition. An electrodeposition-coated film was formed on a glass plate with an IOT film so that the film thickness became 2.5 μm. The electrodeposition coating was conducted under the condition that a liquid temperature of 30° C. and a voltage of 40 V. Then, the resulting electrodeposition-coated film was cured by heating at 250° C. for 40 minutes to obtain a coated plate A.

Optical density, surface electric resistance and surface roughness of the resulting coated plate A were measured. The results are shown in Table 2.

Example 4

Electrodeposition coating

An aqueous solution of an acrylic acid resin neutralized with triethylamine (containing a curing agent) (500 g) was mixed with a dispersion (150 g) (pigment content: 20%) obtained in Example 2 to prepare a coating composition. According to the same manner as that describe din Example 3, an electrodeposition-coated film was formed on a glass plate with an IOT film so that the film thickness became 2.5 μm. The electrodeposition coating was conducted under the condition that a liquid temperature of 30° C. and a voltage of 40 V. Then, the resulting electrodeposition-coated film was cured by heating at 250° C. for 40 minutes to obtain a coated plate B.

Optical density, surface electric resistance and surface roughness of the resulting coated plate B were measured. The results are shown in Table 2.

Comparative Example 3

Electrodeposition coating

According to the same manner as that described in Example 3 except for using the-dispersion (pigment content: 20%) obtained in Comparative Example 1, a comparative coating composition was prepared and it was electrodeposition-coated to obtain a coated plate C.

Optical density, surface electric resistance and surface roughness of the resulting coated plate C were measured. The results are shown in Table 2.

Comparative Example 4

Electrodeposition coating

According to the same manner as that described in Example 3 except for using the dispersion (pigment content: 20%) obtained in Comparative Example 2, a comparative coating composition was prepared and it was eletrodeposition-coated to obtain a coated plate D.

Optical density, surface electric resistance and surface roughness of the resulting coated plate D were measured. The results are shown in Table 2.

TABLE 2

| | Example 3 | Example 4 | Comparative Example 3 | Comparative Example 4 |
|---|---|---|---|---|
| Electro-deposition-coated plate | A | B | C | D |
| Optical density (OD value) | 3.67 | 3.50 | 1.13 | 1.61 |
| Surface electric resistance value | $7.6 \times 10^6 \, \Omega$ | $7 \times 10^6 \, \Omega$ | $3 \times 10^3 \, \Omega$ | $8 \times 10^1 \, \Omega$ |
| Surface roughness | 0.18 μm | 0.25 μm | 0.91 μm | 0.53 μm |

Example 5

Ink composition for ink-jet recording

An ink composition for ink-jet recording comprising 15 parts by weight of the pigment ink (oxidized carbon black: 20%) obtained in Example 1, 80 parts by weight of water, 4 parts by weight of ethanol and 1 part by weight of 2-pyrrolidone was prepared. Then, the ink composition was set in an ink-jet printer and printed. As a result, a distinct image having an OD value of 1.4 was obtained and a blur and a decrease in density were not observed after a long time from printing.

Example 6

Ink composition for a felt pen

An ink composition for a felt pen comprising 30 parts by weight of the pigment ink (oxidized carbon black: 20%) obtained in Example 2, 55 parts by weight of water, 10 parts by weight of ethylene glycol, 5 parts by weight of diethylene glycol and 0.2 parts by weight of an antiseptic agent was prepared. Then, the ink composition was set in a felt pen and written. As a result, writing can be smoothly conducted for a long period of time, and light and water resistances of the written ink were excellent.

What is claimed is:

1. A process for producing aqueous pigment ink, comprising the steps of:

finely dispersing a carbon black having an oil absorptivity of not more than 100 ml/100 g in an aqueous medium; and oxidizing the carbon black by using hypohalite.

2. The process according to claim 1, wherein the carbon black is finely dispersed in the aqueous medium in an amount of 0.5 to 50% by weight.

3. The process according to claim 1, wherein the carbon black is finely dispersed so that it has an particle size of not more than 150 nm in an average.

4. The process according to claim 1, wherein the hypohalite is sodium hypochlorite or potassium hypochlorite.

5. The process according to claim 1, wherein the hypohalite is used in an amount of 1.5 to 75% by weight based on 100% by weight of the carbon black.

6. Aqueous pigment ink obtained by a process according to claim 1, 2, 3, 4 or 5.

7. A coating composition for forming a black matrix, which comprises the aqueous pigment ink according to claim 6 and a film-forming resin.

8. The coating composition for forming a black matrix according to claim 7, wherein the film-forming resin is selected from the group consisting of an acrylic resin, a methacrylic acid derivative resin, a polyester resin, a malated oil resin, an amine-modified acrylic resin, an amine-modified epoxy resin, an amine-modified polybutadiene resin and an amine-modified polyurethanepolyol resin.

9. A process for forming a black matrix comprising a step of electrodepositing the coating composition according to claim 7 on an electrode placed on a substrate.

10. An ink composition for ink-jet recording, which comprises the aqueous pigment ink according to claim 6.

11. A coating composition for writing, which comprises the aqueous pigment ink according to claim 6.

* * * * *